(12) United States Patent
Cormican (10) Patent No.: US 6,474,662 B1
(45) Date of Patent: Nov. 5, 2002

(54) SNOWMOBILE SKI SUSPENSION SYSTEM (76) Inventor: Dale D. Cormican, Rte. 1 Box 153, Mentor, MN (US) 56736

( * ) Notice: Subject to any disclaimer, the term of this patent is extended or adjusted under 35 U.S.C. 154(b) by 0 days.

(21) Appl. No.: 09/849,123

(22) Filed: May 4, 2001

(51) Int. Cl.$^7$ .............................................. B62B 13/00
(52) U.S. Cl. ........................ 280/21.1; 280/124.167; 280/124.168; 180/182; 267/154; 267/274
(58) Field of Search ......................... 280/21.1, 124.166, 280/124.167, 124.168, 124.169, 22.1, 16, 124.137; 180/190, 182, 193, 186; 267/154, 155, 157, 273, 275, 277, 278, 274

(56) References Cited

U.S. PATENT DOCUMENTS

| | | | | |
|---|---|---|---|---|
| 2,571,784 A | * | 10/1951 | Tellcock | 267/154 |
| 3,204,980 A | * | 9/1965 | Guerriero | 280/124.166 |
| 4,052,111 A | * | 10/1977 | Baker | 305/118 |
| 4,069,883 A | * | 1/1978 | Cousineau | 180/185 |
| 4,284,161 A | * | 8/1981 | Blass | 180/184 |
| 4,648,620 A | * | 3/1987 | Nuss | 280/689 |
| 4,919,441 A | * | 4/1990 | Marier et al. | 280/21.1 |
| 5,029,664 A | * | 7/1991 | Zulawski | 180/190 |
| 5,352,055 A | * | 10/1994 | Hellon et al. | 403/24 |
| 5,503,242 A | * | 4/1996 | Jeffers | 180/182 |
| 6,354,391 B1 | * | 3/2002 | Cormican | 180/193 |

* cited by examiner

Primary Examiner—Brian L Johnson
Assistant Examiner—Bryan Fischmann
(74) Attorney, Agent, or Firm—Michael S. Neustel (57) ABSTRACT

A snowmobile ski suspension system for increasing the overall performance and adjustability of a snowmobile front suspension. The snowmobile ski suspension system includes a collar member attached to the chassis of the snowmobile, a torsion spring attached about the collar member, a first arm extending radially from the torsion spring engaging the ski support structure, a second arm extending radially from the torsion spring, and an adjustment member attached to the second arm for allowing adjustment of the stiffness of the torsion spring. The first arm may be attached at various locations along the ski support structure in various manners.

21 Claims, 11 Drawing Sheets

SNOWMOBILE SKI SUSPENSION SYSTEM

BACKGROUND OF THE INVENTION

1. Field of the Invention

The present invention relates generally to snowmobile ski suspensions and more specifically it relates to a snowmobile ski suspension system for increasing the overall performance and adjustability of a snowmobile front suspension.

2. Description of the Prior Art

Snowmobile ski suspension systems have been in use for years. A conventional snowmobile ski suspension system is typically comprised of at least one arm member pivotally attached to the front of the chassis with the distal portion thereof connected to the ski. A shock absorber or similar device is mechanically connected between the chassis and the at least one arm member to dampen the movement of the ski and arm member. To provide an upward lifting force for the front of the chassis, a compression spring is attached between the arm member and the chassis thereby providing support for the front of the chassis and the ski. The compression spring typically surrounds the shock absorber as is common within the snowmobile industry.

Leading snowmobile manufactures that utilize conventional snowmobile front ski suspension systems include ARCTIC CAT (www.arctic-cat.com), POLARIS (www.polarisindustries.com), YAMAHA (www.yamaha.com) and BOMBARDIER (www.skidoo.com). All of these manufacturers utilize the conventional shock absorber with a compression spring surrounding thereof as is well known in the industry. The present invention may be utilized upon any of these conventional front ski suspension systems among others as can be appreciated by one skilled in the art.

The main problem with conventional snowmobile ski suspension systems is that they are difficult to adjust without significant labor and tools. A further problem with convention snowmobile ski suspension systems is that the compression spring surrounding the shock absorber can sometimes damage the shock absorber by physically wearing through the shock absorber from the upward and downward movements of the suspension during usage. Another problem with conventional snowmobile ski suspension systems is that the coils of the compression spring may catch upon objects and components of the snowmobile thereby hampering performance of the suspension. A further problem with conventional ski suspension system is that they do not provide a completely smooth ride for individuals traveling upon extremely rough conditions.

Examples of patented snowmobile front ski suspension systems which are illustrative of such prior art include U.S. Pat. No. 3,884,314 to Callaway; U.S. Pat. No. 3,967,692 to Hoffman; U.S. Pat. No. 5,533,586 to Thompson; U.S. Pat. No. 5,029,664 to Zulawski; U.S. Pat. No. 4,671,521 to Talbot et al., U.S. Pat. No. 4,337,958 to Witt et al., U.S. Pat. No. 6,125,958 to Olson et al., U.S. Pat. No. 3,674,103 to Kiekhaefer; U.S. Pat. No. 3,835,947 to Alexander, Jr.; and U.S. Pat. No. 3,854,541 to Hollnagel.

While these devices may be suitable for the particular purpose to which they address, they are not as suitable for increasing the overall performance and adjustability of a snowmobile front suspension. Conventional snowmobile front ski suspension systems utilize a shock absorber and compression spring combination to support the front chassis of a snowmobile which are inherently difficult to adjust and do not provide a completely stable suspension system.

In these respects, the snowmobile ski suspension system according to the present invention substantially departs from the conventional concepts and designs of the prior art, and in so doing provides an apparatus primarily developed for the purpose of increasing the overall performance and adjustability of a snowmobile front suspension.

SUMMARY OF THE INVENTION

In view of the foregoing disadvantages inherent in the known types of snowmobile ski suspension systems now present in the prior art, the present invention provides a new snowmobile ski suspension system construction wherein the same can be utilized for increasing the overall performance and adjustability of a snowmobile front suspension.

The general purpose of the present invention, which will be described subsequently in greater detail, is to provide a new snowmobile ski suspension system that has many of the advantages of the snowmobile ski suspension systems mentioned heretofore and many novel features that result in a new snowmobile ski suspension system which is not anticipated, rendered obvious, suggested, or even implied by any of the prior art snowmobile ski suspension systems, either alone or in any combination thereof.

To attain this, the present invention generally comprises a collar member attached to the chassis of the snowmobile, a torsion spring attached about the collar member, a first arm extending radially from the torsion spring engaging the ski support structure, a second arm extending radially from the torsion spring, and an adjustment member attached to the second arm for allowing adjustment of the stiffness of the torsion spring. The first arm may be attached at various locations along the ski support structure in various manners.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a snowmobile ski suspension system that will overcome the shortcomings of the prior art devices.

A second object is to provide a snowmobile ski suspension system for increasing the overall performance and adjustability of a snowmobile front suspension.

Another object is to provide a snowmobile ski suspension system that is comprised of a simple design structure.

An additional object is to provide a snowmobile ski suspension system that is simple to adjust.

A further object is to provide a snowmobile ski suspension system that does not utilize a compression spring to support the front chassis.

Another object is to provide a snowmobile ski suspension system that may be utilized upon various snowmobile ski suspension structures.

A further object is to provide a snowmobile ski suspension system that is able to withstand extensive usage upon rough terrain and race tracks.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 11 illustrate a snowmobile ski suspension system 10, which comprises a collar member 32 attached to the chassis 13 of the snowmobile 12, a torsion spring 20 attached about the collar member 32, a first arm 22 extending radially from the torsion spring 20 engaging the ski support structure, a second arm 24 extending radially from the torsion spring 20, and an adjustment member 60 attached to the second arm 24 for allowing adjustment of the stiffness of the torsion spring 20. The first arm 22 may be attached at various locations along the ski support structure in various manners.

Figure 1:
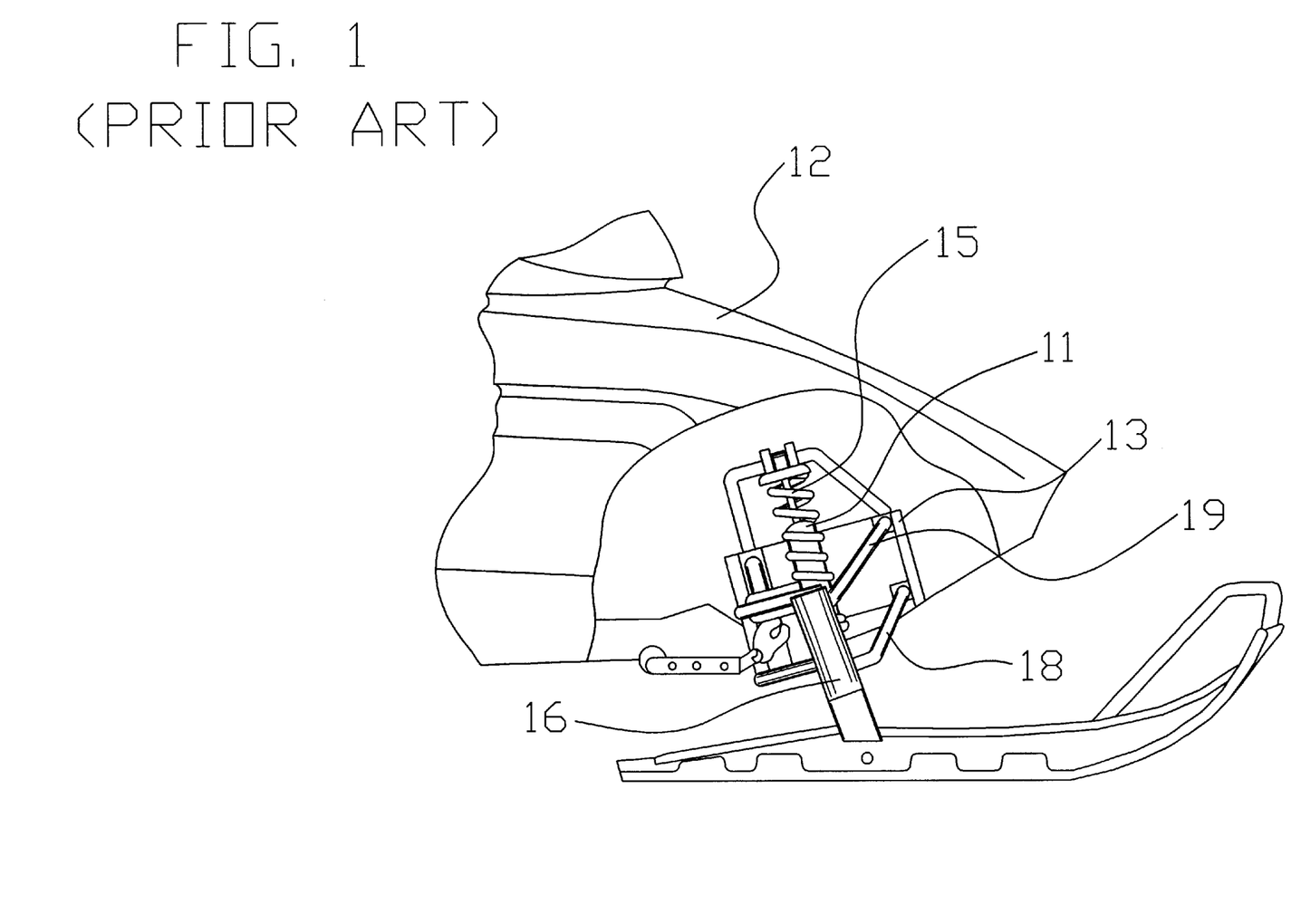
FIG. 1 is a side view of the prior art shock absorber and compression spring combination suspension system.
Figure 2:
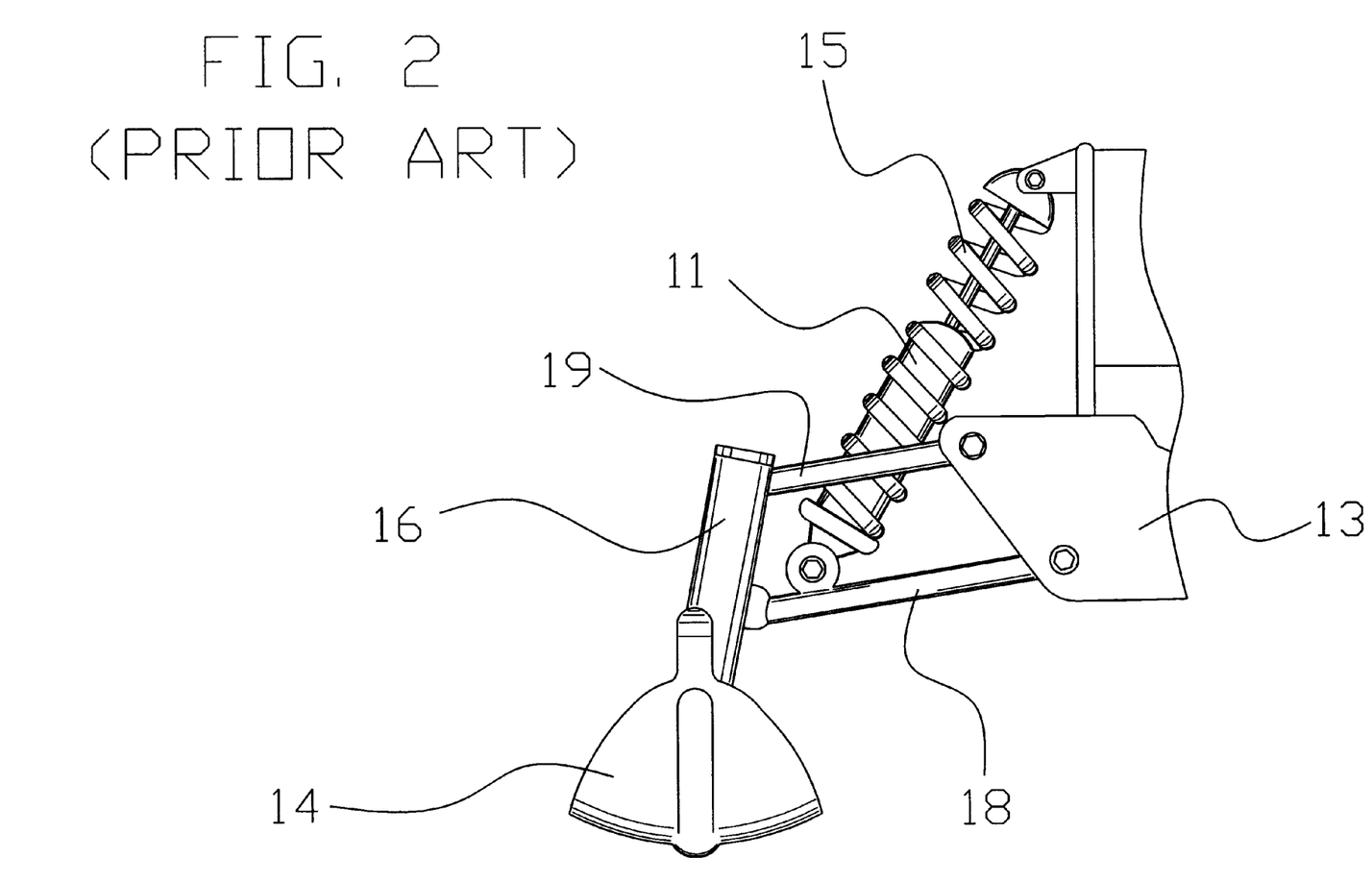
FIG. 2 is a front view of the prior art shock absorber and compression spring combination suspension system.
Figure 3:
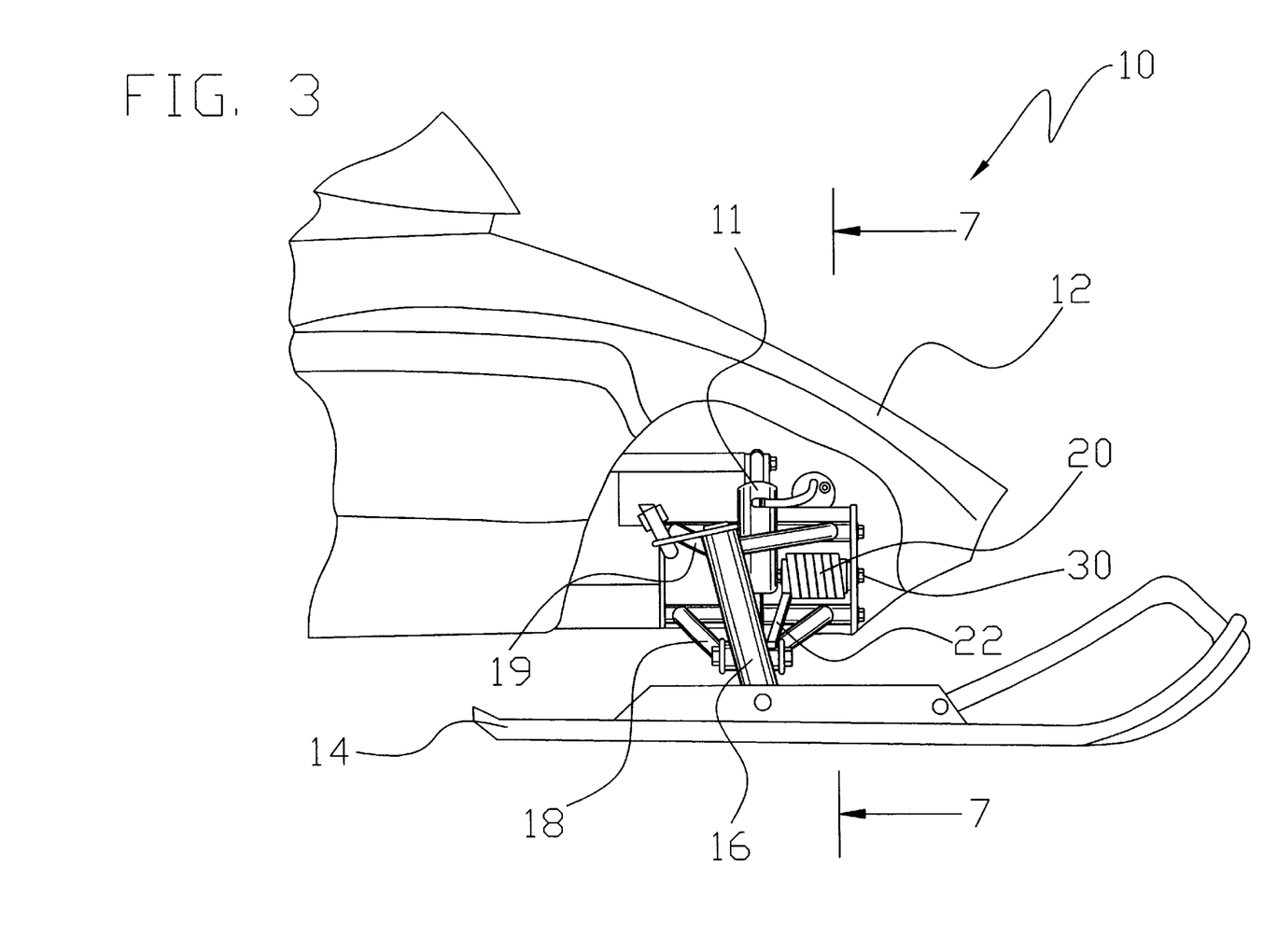
FIG. 3 is a side view of the present invention attached to the snowmobile chassis.
Figure 4:
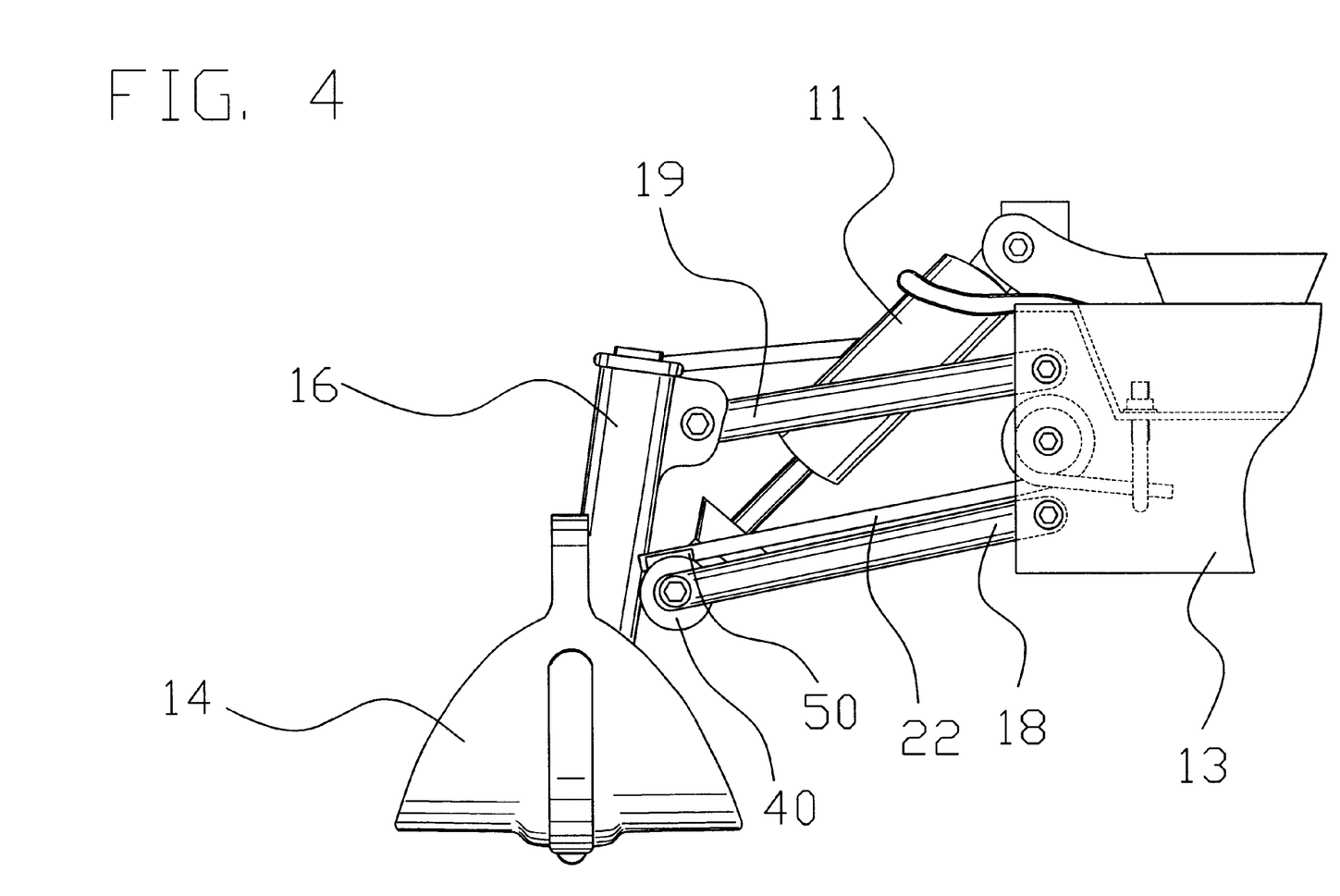
FIG. 4 is a front view of the present invention illustrating the torsion spring connected between the chassis and the suspension arm.
Figure 5:
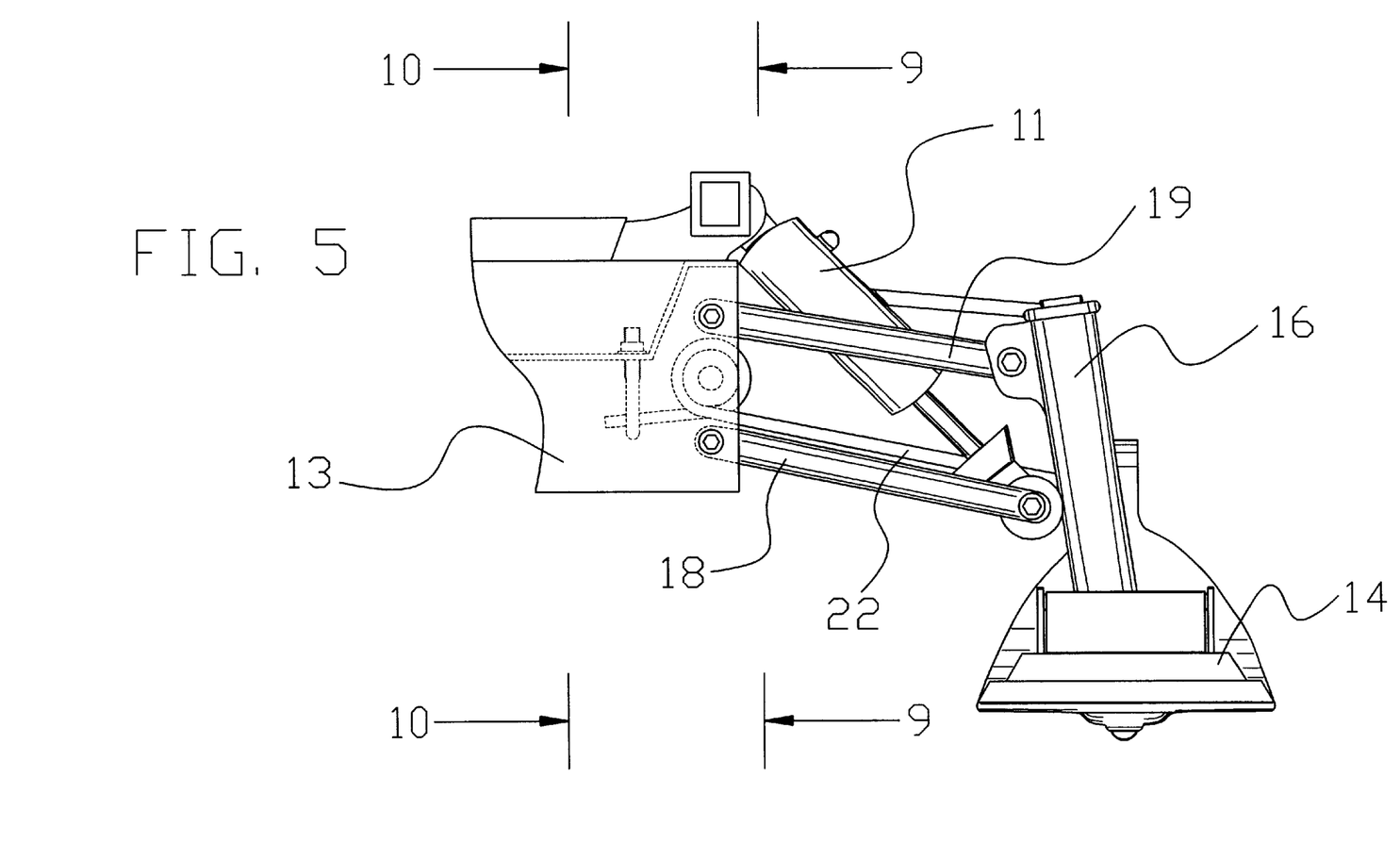
FIG. 5 is a rear view of the present invention attached to the snowmobile chassis.

As shown in FIGS. 1 through 5 of the drawings, a typically snowmobile 12 has a pair of ski support structures on opposing sides of the front chassis 13 of the snowmobile 12. Each ski support structure is typically comprised of at least one suspension arm pivotally attached to the chassis 13 of the snowmobile 12 as are commonly known in the snowmobile 12 industry. FIGS. 2, 3, 4 and 5 of the drawings illustrate the usage of a lower suspension arm 18 and an upper suspension arm 19 that are commonly utilized within the snowmobile industry. The arms 18, 19 pivotally extend from the chassis 13 of the snowmobile 12 with the distal portions thereof pivotally attached to a vertically orientated end support member 16. The end support member 16 is pivotally attached to the ski 14 as is further well known in the industry. At least one shock absorber 11 is connected between the chassis 13 and the end support member 16 (or directly to a suspension arm) for dampening the movement of the ski support structure as is well-known in the art. As is further commonly utilized within the snowmobile 12 industry, a compression If spring 15 typically surrounds the shock absorber 11 for supporting the chassis 13 above a surface as shown in FIGS. 1 and 2 of the drawings. The present invention eliminates the usage of the compression spring 15 to support the chassis 13 above the ground surface as will be discuss in further detail. As can be appreciated, the present invention may be utilized upon various ski support structures such as but not limited to ARCTIC CAT, YAMAHA, SKI DOO, and POLARIS. ARCTIC CAT utilizes a pair of A-frame suspension arms to support the end support member 16 and ski 14. Manufacturers such as YAMAHA and SKI DOO utilize a pair of suspension arms and a trailing arm attached to the end support member 16. Further discussion of the ski support structure of a snowmobile 12 is deemed not to be required as the same is readily apparent within the art of snowmobiles.

Figure 9:
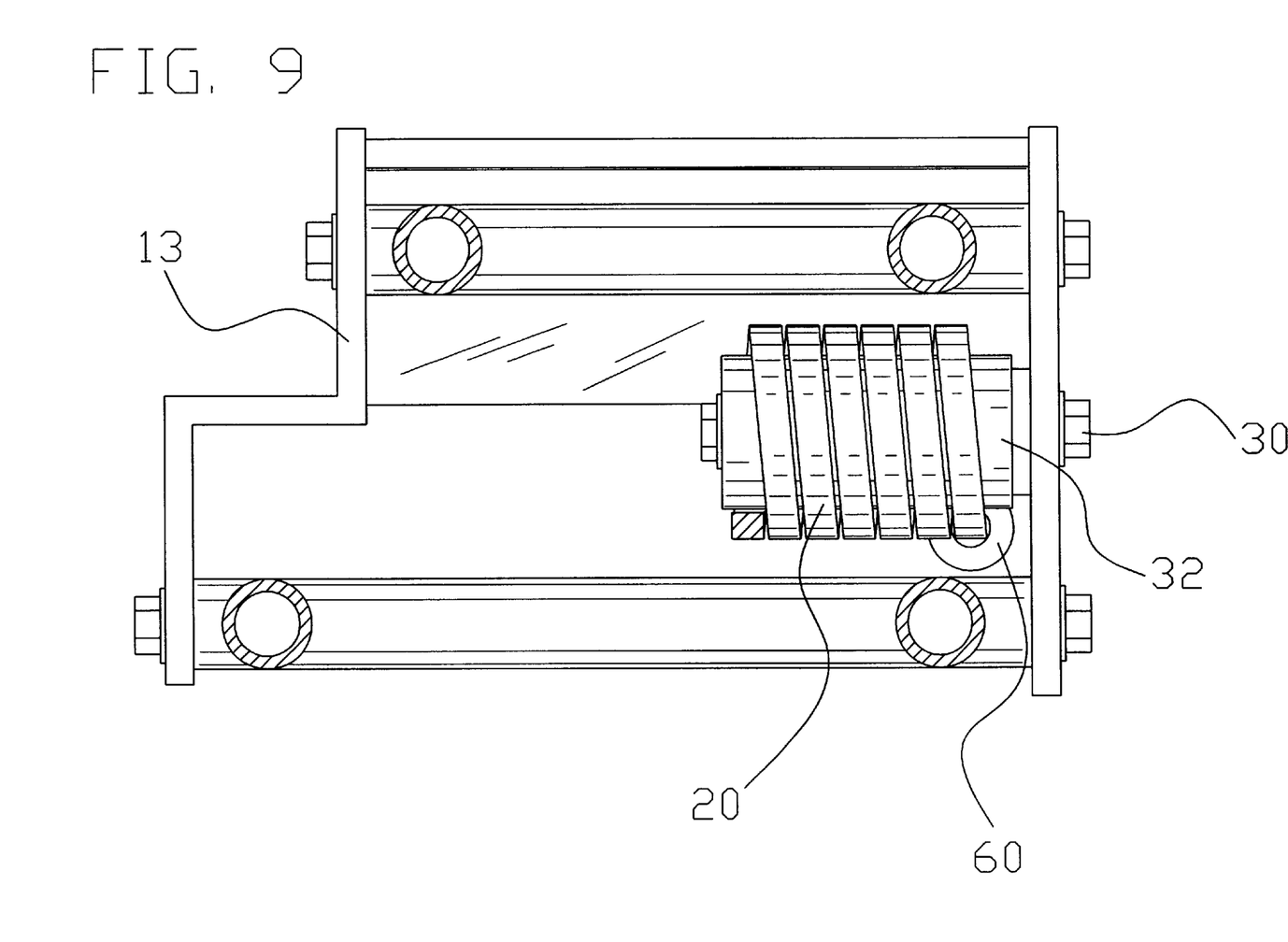
FIG. 9 is a cross sectional view taken along line 9—9 of FIG. 5 illustrating the body portion of the torsion spring.
Figure 10:
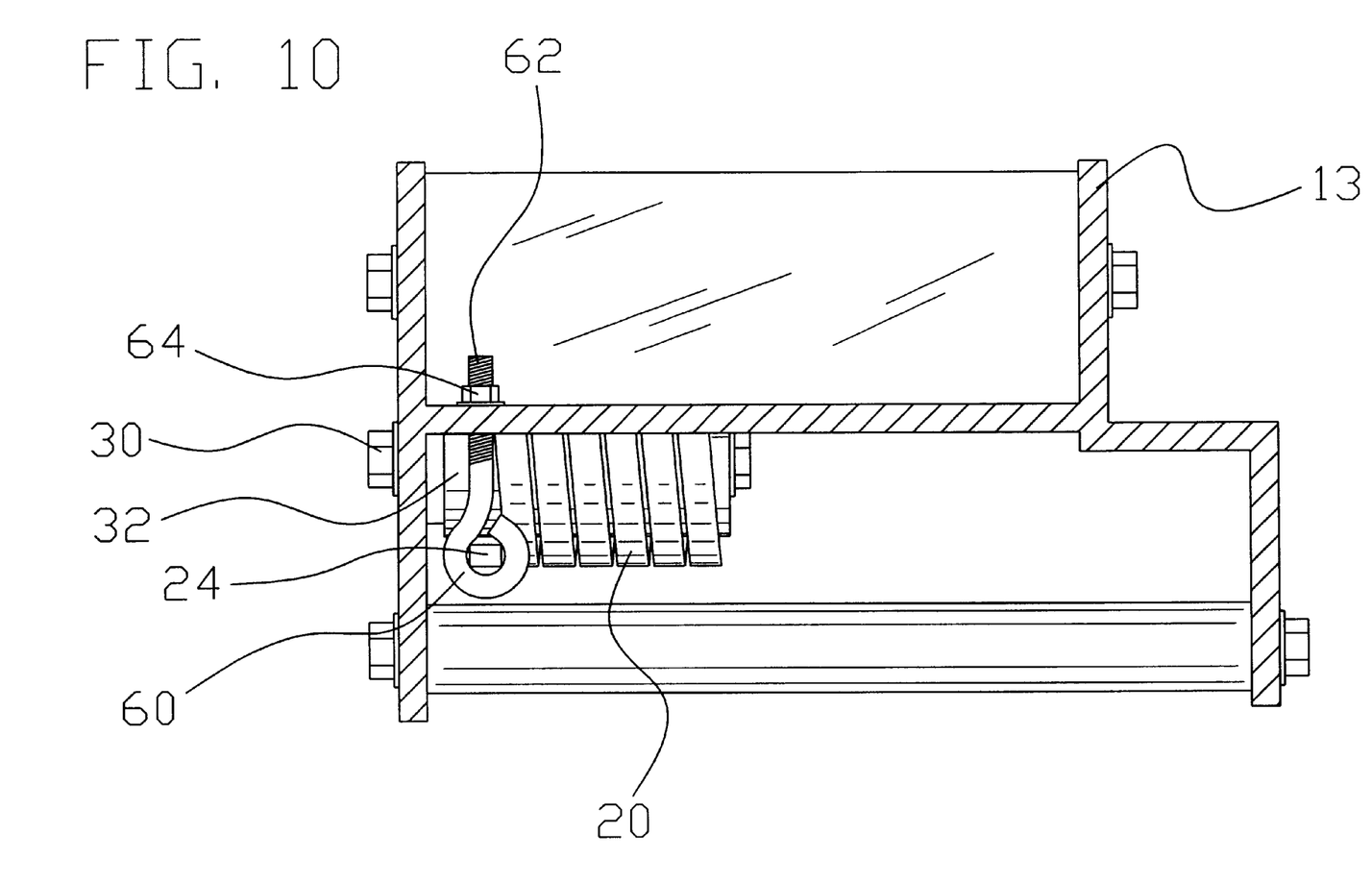
FIG. 10 is a cross sectional view taken along line 10—10 of FIG. 5 illustrating the adjustment mechanism connected to the torsion spring.
Figure 11:
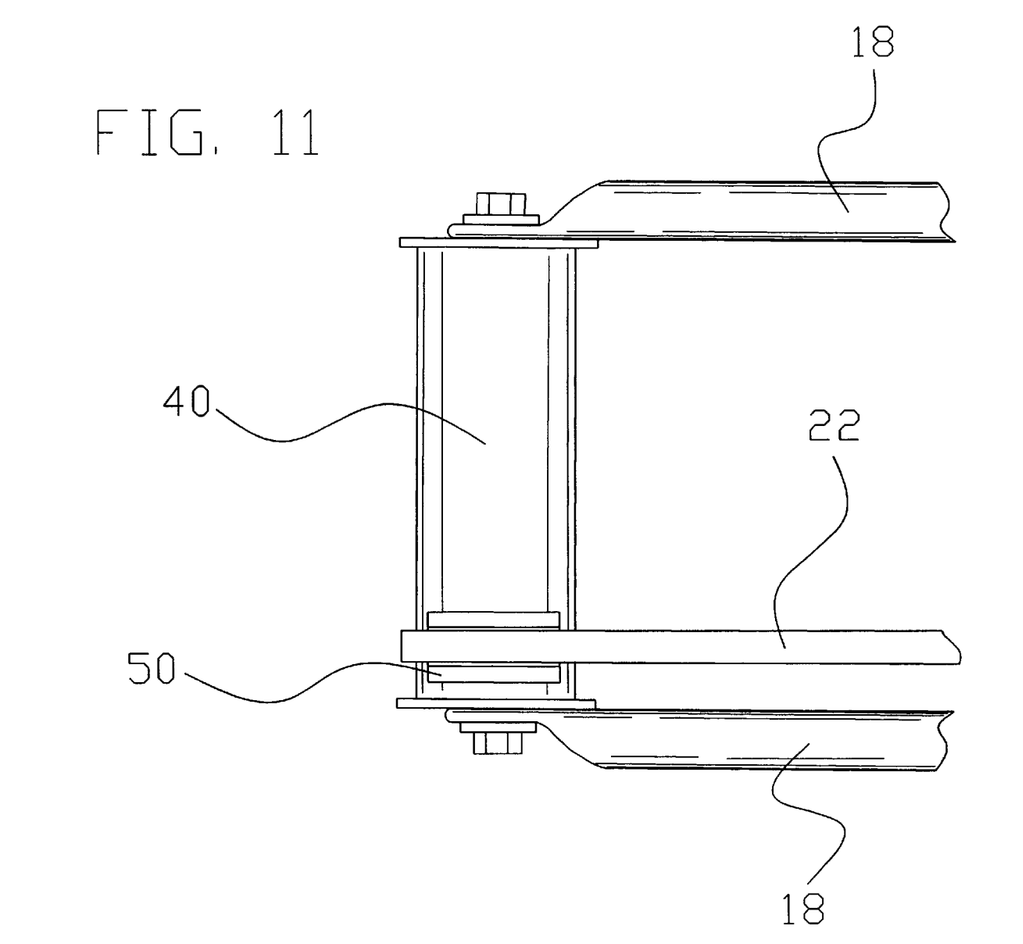
FIG. 11 is a magnified top view of the first arm of the torsion spring engaging a distal portion of the suspension arm.

As best shown in FIGS. 9 and 10 of the drawings, a collar member 32 is attached to the chassis 13 of the snowmobile 12 by a support shaft 30 or other commonly utilized attachment means. The collar member 32 may be comprised of various shapes, structures and designs that are capable of receiving and supporting the torsion spring 20 as shown in FIGS. 9 and 10 of the drawings. The collar member 32 may be comprised of a tubular or solid structure that is capable of receiving the central portion of the torsion spring 20. The collar member 32 is formed for allowing the body of the torsion spring 20 to rotate, compress and expand without interference.

Figure 7:
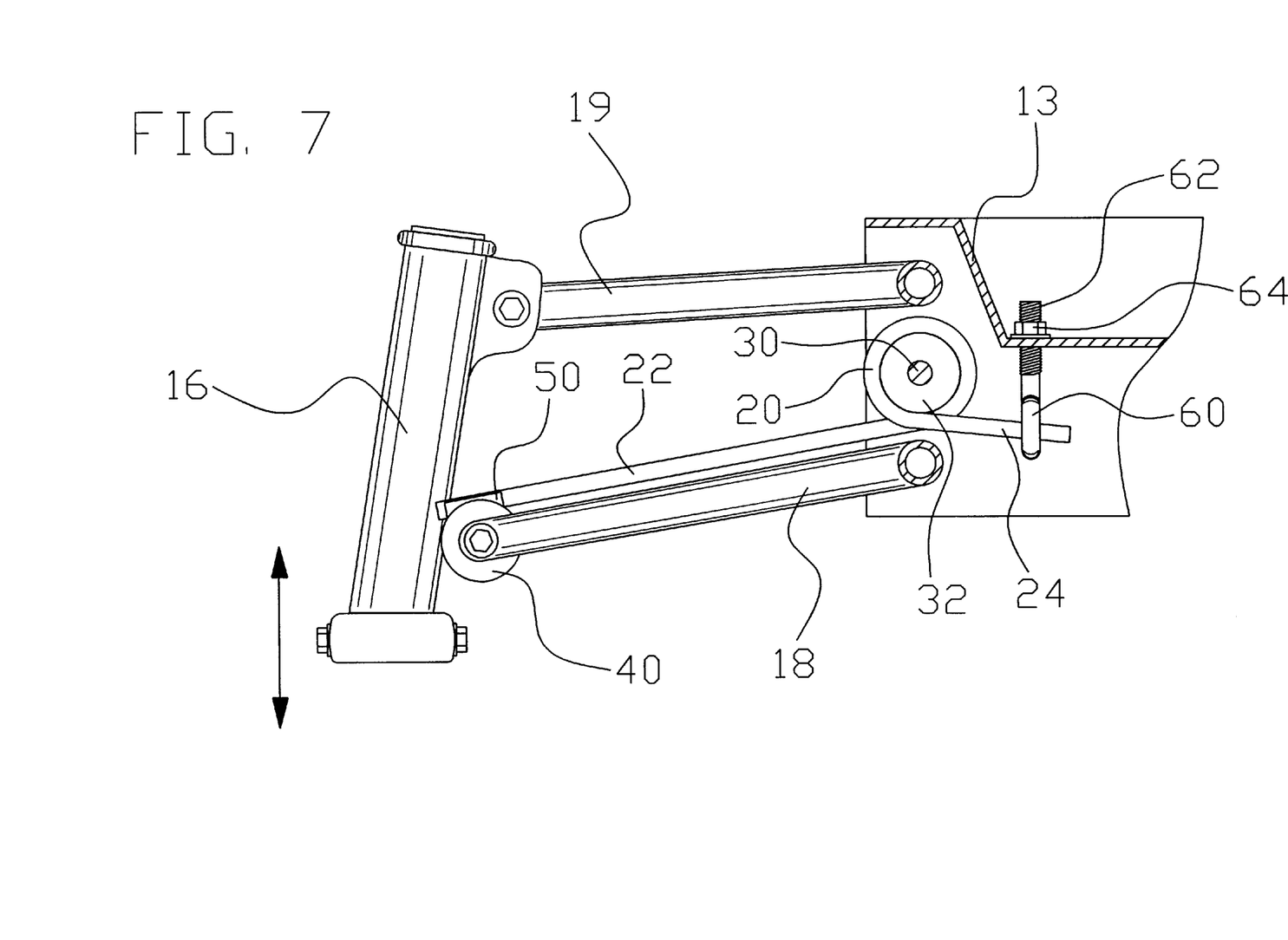
FIG. 7 is a cross sectional view taken along line 7—7 of FIG. 3 illustrating the downward movement of the suspension arm as compared to FIG. 6 of the drawings.
Figure 8:
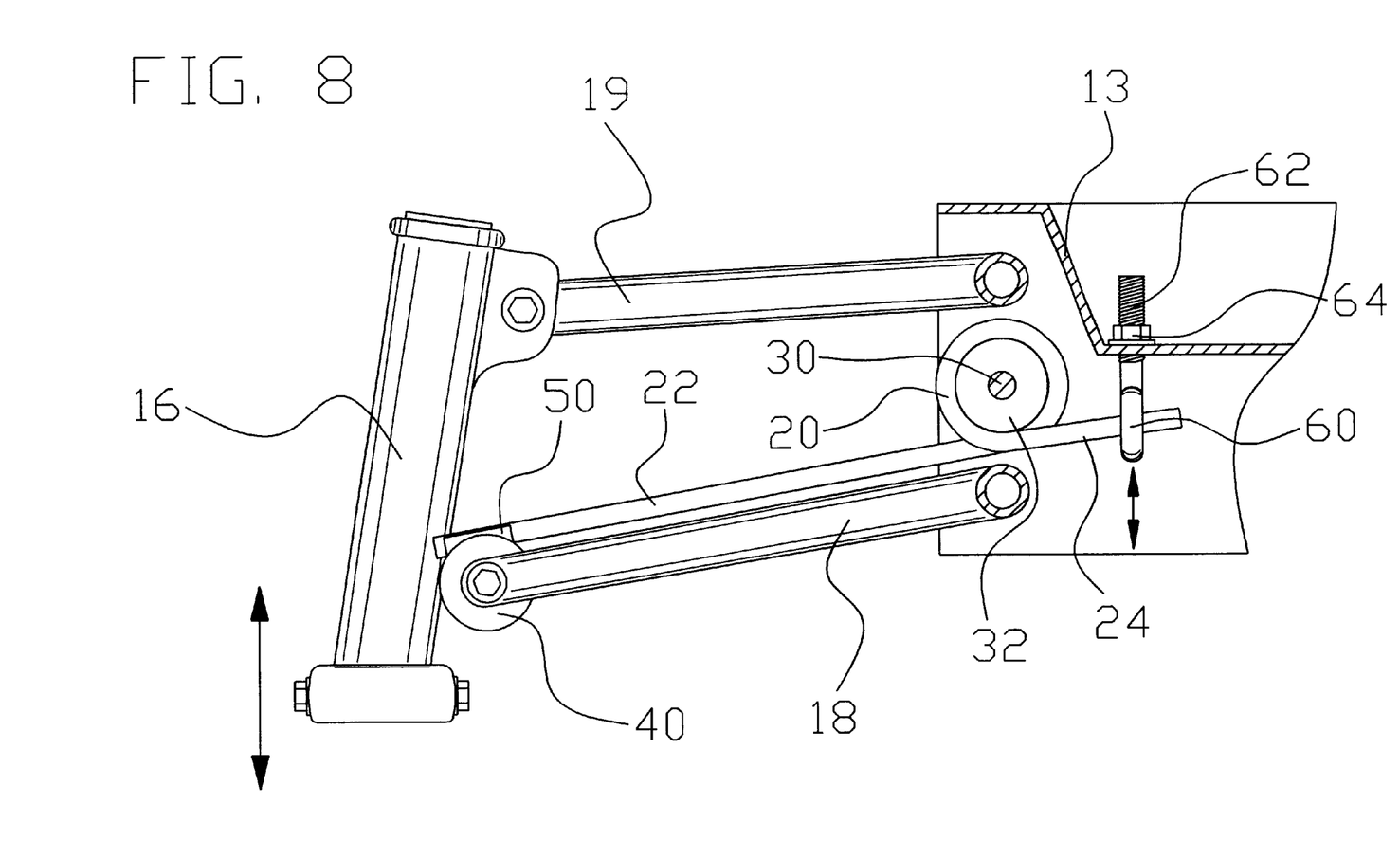
FIG. 8 is a cross sectional view taken along line 7—7 of FIG. 3 illustrating the adjustment of torsion spring into a firmer position.

The torsion spring 20 has a first arm 22 and a second arm 24 as is best shown in FIGS. 7 and 8 of the drawings. The first arm 22 and the second arm 24 radially extend from the body of the torsion spring 20 as further shown in FIGS. 7 and 8 of the drawings. The torsion spring 20 is constructed of a resilient material such as but not limited to carbon steel, stainless steel, oil tempered steel, steel alloys, phosphor bronze, composite materials and the like. The torsion spring 20 may have various resilient characteristics, outer diameters, inner diameters, coil diameters, body lengths, number of coils, helix directions, and ends. The torsion spring 20 may be comprised of various well known structures utilized to construct a torsion spring 20.

Figure 6:
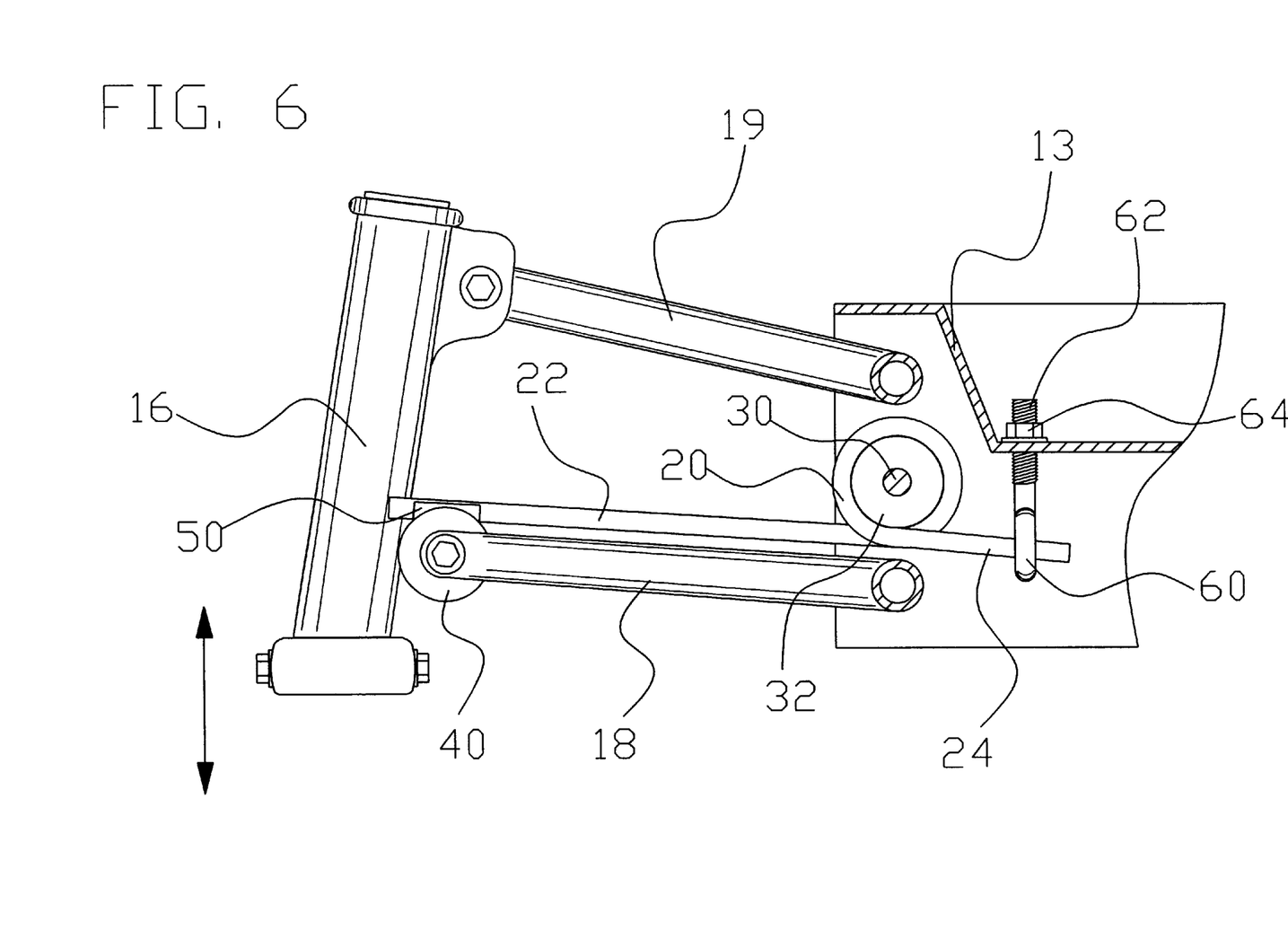
FIG. 6 is a cross sectional view taken along line 7—7 of FIG. 3 illustrating the present invention attached to the snowmobile chassis and the suspension arm.

The second arm 24 of the torsion spring 20 is secured to the chassis 13 for preventing movement thereof. The second arm 24 may have various lengths required to accomplish this attachment to the chassis 13. The second arm 24 may be adjustably attached to the chassis 13 by the usage of an adjustment member 60 or similar structure as shown in FIGS. 6 through 8 of the drawings. The adjustment member 60 is preferably adjustably positioned within the chassis 13 to allow increasing or decreasing of torsion of the torsion spring 20. The adjustment member 60 is positioned to provide clockwise or counter-clockwise movement of the second arm 24 as shown in FIG. 8 of the drawings.

As further shown in FIGS. 6 through 8 of the drawings, the adjustment member 60 preferably includes a threaded portion 62 that is threadably positioned within an interiorly threaded member 64 that is attached to the chassis 13. The interiorly threaded member 64 may be comprised of a conventional nut structure. The distal end of the adjustment member 60 may be comprised of a loop or other structure to receive the second arm 24 of the torsion spring 20.

The user adjusts the torsion of the torsion spring 20 by rotating the interiorly threaded member 64 which moves the second arm 24 in the desired direction. For example, if the user desired to create more torsion within the torsion spring 20, the user would tighten the interiorly threaded member 64 upon the threaded portion 62 of the adjustment member 60 thereby drawing the adjustment member 60 and the second arm 24 of the torsion spring 20 upwardly as shown in FIG. 8 of the drawings. Various other means for adjusting and securing the adjustment member 60 may be utilized that are common within the art. It can also be appreciated that the adjustment member 60 may be positioned below or to the side of the second arm 24 though not illustrated within the drawings.

As shown in FIGS. 3 through 8 of the drawings, the first arm 22 of the torsion spring 20 extends from the body thereof toward the end support member 16. The first arm 22 may be connected directly to the end support member 16 or to one of the suspension arms 18, 19 to provide a torsion force to the ski support structure.

As shown in FIGS. 6 through 8 and 11, a cradle member 50 may be attached to a lower bracket 40 or suspension arm 18, 19 to receive a portion of the first arm 22. The cradle member 50 preferably has a U-shaped cross sectional shape, however various other structures may be utilized to receive the first arm 22. The lower bracket 40 may be directly connected to either or both the end support member 16 and one of the suspension arms 18, 19. The first arm 22 may be engaged at various locations besides the distal portion thereof even though not illustrated within the drawings.

In use, the user adjusts the adjustment member 60 to manipulate the second arm 24 thereby creating the desired level of torsion within the torsion spring 20. For example, if an increased torsion upon the ski support structure is desired (i.e. stiffer suspension), the user would adjust the adjustment member 60 to increase the torsion within the torsion spring 20. If a decreased torsion upon the ski support structure is desired (i.e. softer suspension), the user would adjust the adjustment member 60 to decrease the torsion within the torsion spring 20. The applied torsion of the torsion spring 20 upon the ski support structure elevates the chassis 13 above the ground surface as shown in FIGS. 3 through 8 of the drawings. During riding of the snowmobile 12 when the ski 14 encounters an obstacle or bump within the riding surface, the ski 14 is elevated upwardly with the torsion spring 20 applying an increased torsion upon the ski support structure as the first arm 22 is rotated upwardly as shown in FIG. 6 of the drawings. When the ski 14 encounters a depression within the riding surface, the ski 14 is lowered downwardly with the torsion spring 20 applying a decreased torsion upon the ski support structure as the first arm 22 is rotated downwardly as shown in FIG. 7 of the drawings. This process continues during the riding of the snowmobile 12. The user may at anytime during riding adjust the adjustment member 60 for adjusting the ride of the snowmobile 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snowmobile ski suspension system having at least one suspension arm extending from a chassis and an end support member attached to said at least one suspension arm for supporting a ski, comprising:
    a torsion spring attached to said chassis; and
    a first arm radially extending from said torsion spring, wherein said first arm is attached to said end support member;
    wherein an end of said torsion spring opposite of said first arm is non-movably attached to said chassis.

2. The snowmobile ski suspension system of claim 1, wherein said torsion spring movably surrounds a collar member attached to said chassis.

3. The snowmobile ski suspension system of claim 2, wherein said collar member allows said torsion spring to contract and expand.

4. The snowmobile ski suspension system of claim 1, including a means for adjusting a torsion of said torsion spring.

5. The snowmobile ski suspension system of claim 4, wherein said means for adjusting said torsion comprises:
    a second arm radially extending from said torsion spring; and
    an adjustment mechanism attached to said second arm for allowing rotational adjustment of said second arm thereby increasing or decreasing said torsion of said torsion spring.

6. The snowmobile ski suspension system of claim 5, wherein said adjustment mechanism comprises:
    an adjustment member having a first end attached to said second arm and a threaded portion movably extending through said chassis; and
    an interiorly threaded member threadably attached to said threaded portion for adjusting said adjustment member and said second arm.

7. The snowmobile ski suspension system of claim 1, including a cradle member attached to said end support member, wherein said cradle member receives a distal portion of said first arm.

8. The snowmobile ski suspension system of claim 7, wherein said cradle member is comprised of a U-shaped cross sectional area.

9. The snowmobile ski suspension system of claim 1, including a lower bracket attached to said end support member, wherein said at least one suspension arm is attached to said lower bracket and wherein said first arm is attached to said lower bracket.

10. A snowmobile ski suspension system having at least one suspension arm extending from a chassis and an end support member attached to said at least one suspension arm for supporting a ski, comprising:

a torsion spring attached to said chassis; and a first arm radially extending from said torsion spring, wherein said first arm is attached to said at least one suspension arm;

wherein an end of said torsion spring opposite of said first arm is non-movably attached to said chassis.

11. The snowmobile ski suspension system of claim 10, wherein said torsion spring movably surrounds a collar member attached to said chassis.

12. The snowmobile ski suspension system of claim 4, wherein said collar member allows said torsion spring to contract and expand.

13. The snowmobile ski suspension system of claim 10, including a means for adjusting a torsion of said torsion spring.

14. The snowmobile ski suspension system of claim 13, wherein said means for adjusting said torsion comprises:

a second arm radially extending from said torsion spring; and an adjustment mechanism attached to said second arm for allowing rotational adjustment of said second arm thereby increasing or decreasing said torsion of said torsion spring.

15. The snowmobile ski suspension system of claim 14, wherein said adjustment mechanism comprises:

an adjustment member having a first end attached to said second arm and a threaded portion movably extending through said chassis; and an interiorly threaded member threadably attached to said threaded portion for adjusting said adjustment member and said second arm.

16. The snowmobile ski suspension system of claim 10, including a cradle member attached to said at least one suspension arm, wherein said cradle member receives a distal portion of said first arm.

17. The snowmobile ski suspension system of claim 16, wherein said cradle member is comprised of a U-shaped cross sectional area.

18. A snowmobile ski suspension system having at least one suspension arm extending from a chassis, comprising:

a torsion spring having a coiled section, a first arm extending from said coiled section, and a second arm extending from said coiled section opposite of said first arm;

wherein said second arm is attached to said chassis; and wherein said first arm is attached to said at least one suspension arm applying a continuous downward force upon said first arm.

19. A snowmobile ski suspension system having at least one suspension arm extending from a chassis, comprising:

a torsion spring attached to said chassis, wherein said torsion spring movably surrounds a collar member attached to said chassis; and a first arm radially extending from said torsion spring, wherein said first arm is attached to said at least one suspension arm.

20. A snowmobile ski suspension system having at least one suspension arm extending from a chassis, comprising:

a torsion spring attached to said chassis;

a first arm radially extending from said torsion spring, wherein said first arm is attached to said at least one suspension arm;

a second arm radially extending from said torsion spring; and an adjustment mechanism attached to said second arm for allowing rotational adjustment of said second arm thereby increasing or decreasing said torsion of said torsion spring.

21. The snowmobile ski suspension system of claim 20, wherein said adjustment mechanism comprises:

an adjustment member having a first end attached to said second arm and a threaded portion movably extending through said chassis; and an interiorly threaded member threadably attached to said threaded portion for adjusting said adjustment member and said second arm.

* * * * *